US005320813A

United States Patent [19]

Castagnos, Jr.

[11] Patent Number: 5,320,813

[45] Date of Patent: Jun. 14, 1994

[54] COKE SHIELD TO PROTECT VENT ORIFICE IN FLUID CATALYTIC CRACKING DIRECT-CONNECTED CYCLONE APPARATUS

[75] Inventor: Leonce F. Castagnos, Jr., The Woodlands, Tex.

[73] Assignee: Texaco Inc., White Plains, N.Y.

[21] Appl. No.: 79,291

[22] Filed: Jun. 21, 1993

[51] Int. Cl.$^{5}$ .................... F27B 15/08; B01D 45/12

[52] U.S. Cl. .................... 422/147; 422/144; 55/459.1; 55/345

[58] Field of Search .............. 422/147, 144, 145, 146; 55/459.1, 345

[56] References Cited

U.S. PATENT DOCUMENTS

| | | | |
|---|---|---|---|
| 3,684,093 | 8/1972 | Kono et al. | 55/459.1 X |
| 3,720,314 | 3/1973 | Phillippi | 55/459.1 X |

*Primary Examiner*—Robert J. Warden
*Assistant Examiner*—Christopher Y. Kim
*Attorney, Agent, or Firm*—James L. Bailey; Kenneth R. Priem; Russell J. Egan

[57] ABSTRACT

A coke shield is mounted on a reactor cyclone outlet tube spaced above the roof of the cyclone body so as to protect a vent orifice between the cyclone roof and outlet tube from clogging with debris. The coke shield is also provided with a plurality of apertures to prevent any pressure unbalance in the system.

4 Claims, 1 Drawing Sheet

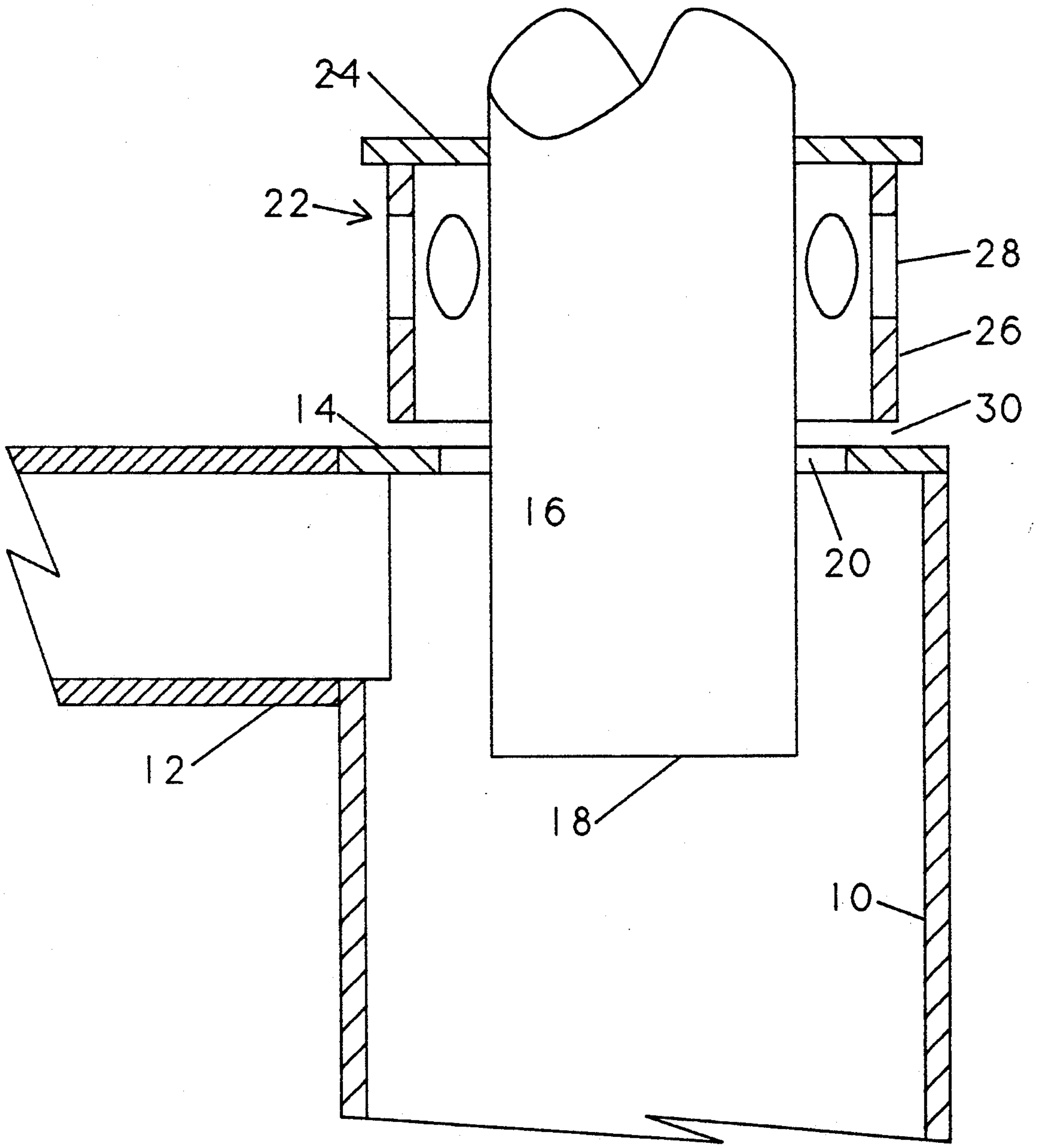
24
22
28
26
30
14
16
20
12
18
10

COKE SHIELD TO PROTECT VENT ORIFICE IN FLUID CATALYTIC CRACKING DIRECT-CONNECTED CYCLONE APPARATUS

BACKGROUND OF THE INVENTION

1. The Field of the Invention

The present invention concerns means to define a low wear, clogging resistant vent orifice in cyclone apparatus.

2. The Prior Art

Copending patent application Ser. No. 07/811,729, filed Dec. 23, 1991, now U.S. Pat. No. 5,248,411, the disclosure of which is incorporated herein by reference describes an apparatus for rapidly separating catalyst from a cracked hydrocarbon gas in a fluidized catalytic cracking (FCC) unit. It also describes a process for withdrawing stripper gas from an FCC reactor vessel. A feature of the disclosed invention is the location of the vent orifice for reactor and stripper gasses in an annular space formed around the reactor cyclone outlet tube and the roof of the reactor cyclone. This location for the vent orifice has been shown to have a unique advantage over systems practiced by others in the operation and pressure balance of direct-connected cyclone systems.

In direct-connected cyclone systems the vent orifice can serve as an expansion connection between a first stage of a reactor cyclone and a second stage or upper cyclone. Therefore, freedom of movement between the reactor cyclone outlet tube and cyclone roof must be maintained. Sizing of the vent orifice and maintenance of the vent orifice clearance is critical to maintaining proper operation of the direct-connected cyclone during an extended run on an FCCU. The tolerances required to maintain the proper pressure may be susceptible to plugging by catalyst and/or coke as a result of its location on the cyclone roof. For example, in one known system, the width of the annular gap of the vent orifice is only about 20 mm.

The process of fluid catalytic cracking (FCC) comprises mixing hot regenerated catalyst with a hydrocarbon feedstock in a transfer line riser reactor under catalytic cracking reaction conditions. The feedstock is cracked to yield gasoline boiling range hydrocarbon as well as degradation products, such as coke which deposits on the catalyst causing a reduction in catalytic activity. Hydrocarbon vapor and coked catalyst are passed from the top of the riser reactor directly to a separator vessel, typically a cyclone separator, wherein catalyst is separated from hydrocarbon. In the FCC art, the separator vessel is termed the reactor vessel. The separated catalyst is passed to a stripper wherein it is contacted with a stripping gas to remove volatile hydrocarbon. Stripped catalyst is then passed to a separate regeneration vessel wherein coke is removed from the catalyst by oxidation at a controlled rate. Catalyst, substantially freed of coke, is collected in a vertically oriented regenerated catalyst standpipe. The catalyst is passed from the standpipe to the riser reactor for cyclic reuse in the process.

U.S. Pat. Nos. 4,623,446 and 4,737,346 to J. H. Haddad et al teach a closed coupled cyclone separator system in the reactor vessel of a fluid catalytic cracking apparatus. Means is provided for blending stripping gas with cracked hydrocarbon as it flows to a directly coupled riser reactor cyclone separator. As show in FIG. 7 and 8, the riser reactor conduit is modified to comprise an overlapping downstream portion 118 to provide an annulus between the upstream portion 117 and the downstream portion 118. The annulus is covered by a flat metal ring having orifices 125 in open communication with the reactor vessel, enabling stripping gas to pass into the downstream conduit 118. A riser cyclone dipleg is sized, as seen in FIG. 5, to admit at least a portion of stripping gas from the stripping zone to pass countercurrent to catalyst passing downwardly through the dipleg.

U.S. Pat. No. 4,502,947 to Haddad et al discloses a closed cyclone fluid catalytic cracking catalyst separation method and apparatus. In the closed cyclone, hydrocarbon product and catalyst are passed directly into a cyclone separator from a riser without passing into the atmosphere of the reactor vessel. Avoiding the atmosphere of the reactor vessel reduces both excess catalytic cracking and high temperature thermal cracking.

SUMMARY OF THE INVENTION

A roof portion of a reactor cyclone is provided with an aperture. An outlet tube is mounted in and extends through the aperture defining an annular vent orifice therebetween. A coke shield is formed by an annular plate secured to the outlet tube spaced above the orifice. A cylindrical skirt depends from the outer edge of the annular plate terminating at a point spaced above the roof. A plurality of apertures are formed in the skirt to prevent pressure differentials from forming across the shield.

BRIEF DESCRIPTION OF THE DRAWINGS

The present invention will now be described with reference to the accompanying drawings, by way of example, in which the single FIGURE is a schematic vertical section through a portion of a cyclone apparatus incorporating the present invention.

DETAILED DESCRIPTION OF THE PREFERRED EMBODIMENT

The present invention has been shown as it would be installed on and form part of a reactor cyclone, only an upper portion of the cyclone body 10 being shown. An inlet duct 12 enters the cyclone body 10 at the level of the cyclone roof 14. The cyclone roof 14 defines an aperture 16 through which the reactor cyclone outlet tube 18 passes defining an annular vent orifice 20 therebetween. A coke shield 22 is mounted on the outlet tube 18. The shield 22 is formed by an annular plate 24 with a cylindrical skirt 26 depending therefrom. The skirt 26 is provided with a plurality of regularly spaced apertures 28. The inner edge of the annular plate 24 is fixed to the outlet tube 18 spaced above roof 14 in such fashion as to form a gap 30 between the roof 14 and the lower edge of the skirt.

The coke shield provides protection to the vent orifice 20, in a direct-connected cyclone system while maintaining free movement between the cyclone outlet tube 18 and cyclone roof 14. The coke shield 22 is similar to an inverted "can" which is attached to the outlet tube. Vent holes 28 are provided in the sides of the skirt 26 to allow stripper gasses, reactor dome steam, and dipleg blowdown gasses to enter the reactor cyclone through the vent orifice 20 and exit the cyclone via the outlet tube 18. These vent holes 28 in the sides of the skirt 26 are located above the level to which catalyst (not shown) might build up on the roof 14 of the cyclone, as determined by the catalyst angle of repose. The total area of the vent holes 28 is designed to be many times the area of the vent orifice 20 so as not to be a factor in the system pressure balance. The vertical orientation of these vent holes 28 in the sides of the skirt 26, and the relatively low velocity of gasses flowing through these vent holes, will insure that large pieces of coke are not entrained into the coke shield where they may lodge in the vent orifice 20. Note that the vertical clearance between the lower edge of the coke shield 22 and the cyclone roof 14 is designed to accommodate the thermal expansion of the reactor/cyclone system while allowing for free movement between the outlet tube 18 and reactor cyclone body 10.

The present invention may be subject to many modifications and changes without departing from the spirit or essential characteristics thereof. The present embodiment is therefor to be considered in all respects as illustrative and not restrictive of the scope of the invention.

I claim:

1. In a cyclone having a body with a roof thereof defining an aperture, an outlet tube mounted in and extending through said aperture defining a vent orifice therebetween, the improvement comprising a coke shield having an annular plate secured to said outlet tube spaced above said roof and an integral cylindrical skirt depending from said annular plate terminating at a point spaced above said roof, and a plurality of apertures in said skirt whereby no pressure differential is created across said coke shield.

2. A coke shield for a cyclone comprising:

a reactor cyclone housing having a roof defining an aperture;

an outlet tube mounted in and extending through said aperture defining an annular vent therebetween;

an annular plate fixed to said outlet tube spaced above said roof; and a cylindrical skirt attached to and depending from the outer edge of said annular plate to a line spaced above said roof.

3. A coke shield according to claim 2 wherein said annular plate and said skirt both have outer diameters larger than said roof aperture.

4. A coke shield according to claim 2 wherein said skirt has a plurality of apertures therein preventing creation of a pressure differential across said shield.

* * * * *